United States Patent

Miro et al.

[11] Patent Number: 6,087,459
[45] Date of Patent: Jul. 11, 2000

[54] POLYMERIC MATERIALS FORMED USING BLENDS OF ELECTRON DONORS

[75] Inventors: Nemesio D. Miro, Seabrook, Tex.; Masatoshi Ohkura, Yokohama, Japan

[73] Assignee: Exxon Chemical Patents Inc., Houston, Tex.

[21] Appl. No.: 09/079,425

[22] Filed: May 14, 1998

[51] Int. Cl.[7] ...................................................... C08F 4/616
[52] U.S. Cl. ............................ 526/128; 526/90; 526/116; 526/124.5; 526/125.3; 526/351; 526/348.3; 526/348.6; 526/123.1; 502/113; 502/116
[58] Field of Search .................. 526/90, 116, 124.5, 526/125.3, 128, 351, 348.3, 348.6, 123.1; 502/103, 116

[56] References Cited

U.S. PATENT DOCUMENTS

| | | |
|---|---|---|
| 4,218,339 | 8/1980 | Zucchini et al. . |
| 4,328,122 | 5/1982 | Monte et al. . |
| 4,340,704 | 7/1982 | Borghi et al. . |
| 4,395,360 | 7/1983 | Albizatti et al. . |
| 4,473,660 | 9/1984 | Albizzati et al. . |
| 4,493,923 | 1/1985 | McCullough, Jr. . |
| 4,535,068 | 8/1985 | Job . |
| 4,563,512 | 1/1986 | Goodall ................................. 526/125 |
| 4,927,797 | 5/1990 | Ewen . |
| 4,990,477 | 2/1991 | Kioka et al. . |
| 4,990,479 | 2/1991 | Ishimaru et al. . |
| 5,100,981 | 3/1992 | Schreck et al. ......................... 526/125 |
| 5,159,021 | 10/1992 | Kioka et al. . |
| 5,244,989 | 9/1993 | Hara et al. . |
| 5,338,801 | 8/1994 | Eppert, Jr. . |
| 5,449,738 | 9/1995 | Koura et al. ............................ 525/247 |
| 5,455,303 | 10/1995 | Panagopoulos, Jr. et al. . |
| 5,552,482 | 9/1996 | Berta . |
| 5,652,303 | 7/1997 | Ishimaru et al. ....................... 526/125.3 |
| 5,733,980 | 3/1998 | Cozewith et al. . |

FOREIGN PATENT DOCUMENTS

| | | |
|---|---|---|
| 0 349 772 | 1/1990 | European Pat. Off. . |
| 0 385 765 A2 | 9/1990 | European Pat. Off. . |
| 0385765 | 9/1990 | European Pat. Off. . |
| 0 490 353 A2 | 6/1992 | European Pat. Off. . |
| 0 601 496 A1 | 6/1994 | European Pat. Off. . |
| 0 657 447 | 6/1995 | European Pat. Off. . |
| 0 717 053 | 6/1996 | European Pat. Off. . |
| 0 790 262 | 8/1997 | European Pat. Off. . |
| 2 035 343 | 6/1980 | United Kingdom . |
| WO 95/21203 | 8/1995 | WIPO . |
| WO 97 43321 | 11/1997 | WIPO . |

*Primary Examiner*—David W. Wu
*Assistant Examiner*—Ling-Siu Choi
*Attorney, Agent, or Firm*—Douglas W. Miller; David J. Alexander

[57] ABSTRACT

A method of forming a polymer that simultaneously provides an improved level of impact resistance and processability in which an α-olefin monomer is subjected to polymerization in the presence of a Ziegler-Natta catalyst system and a blend of electron donors including dicyclopentyldimethoxysilane (DCPMS) and propyltriethoxysilane (PTES). The polymer so formed will have a relationship between a first melt flow rate of a homopolymer formed by polymerizing an α-olefin monomer in the presence of a Ziegler-Natta catalyst system and a first electron donor (MFR (a)), and a second melt flow rate of a homopolymer formed polymerizing an α-olefin monomer in the presence of the Ziegler-Natta catalyst system and a second electron donor (MFR (b)), is defined by the equation:

$$1.2 \leq \log [MFR(b)/MFR(a)] \leq 1.4$$

60 Claims, 3 Drawing Sheets

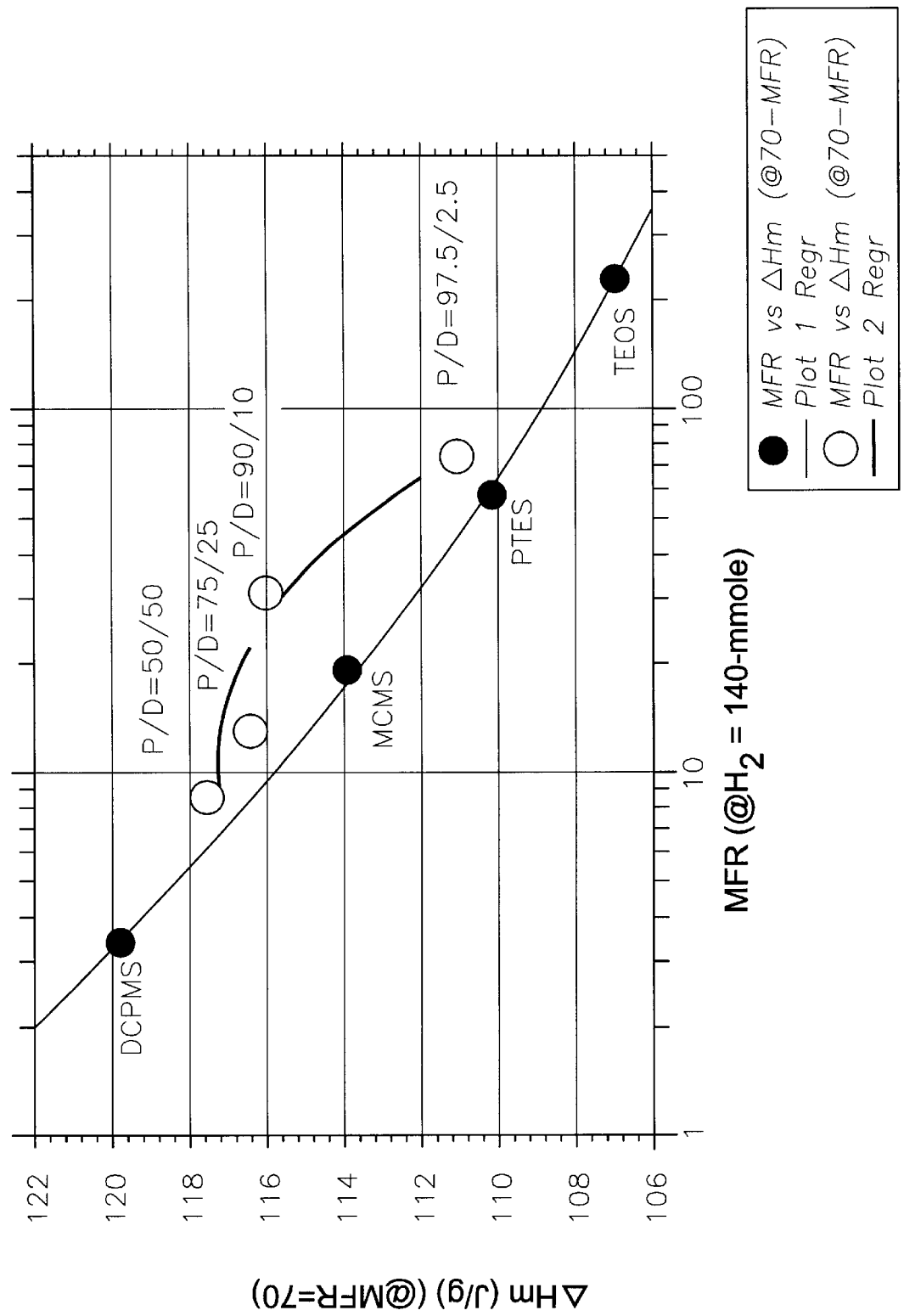

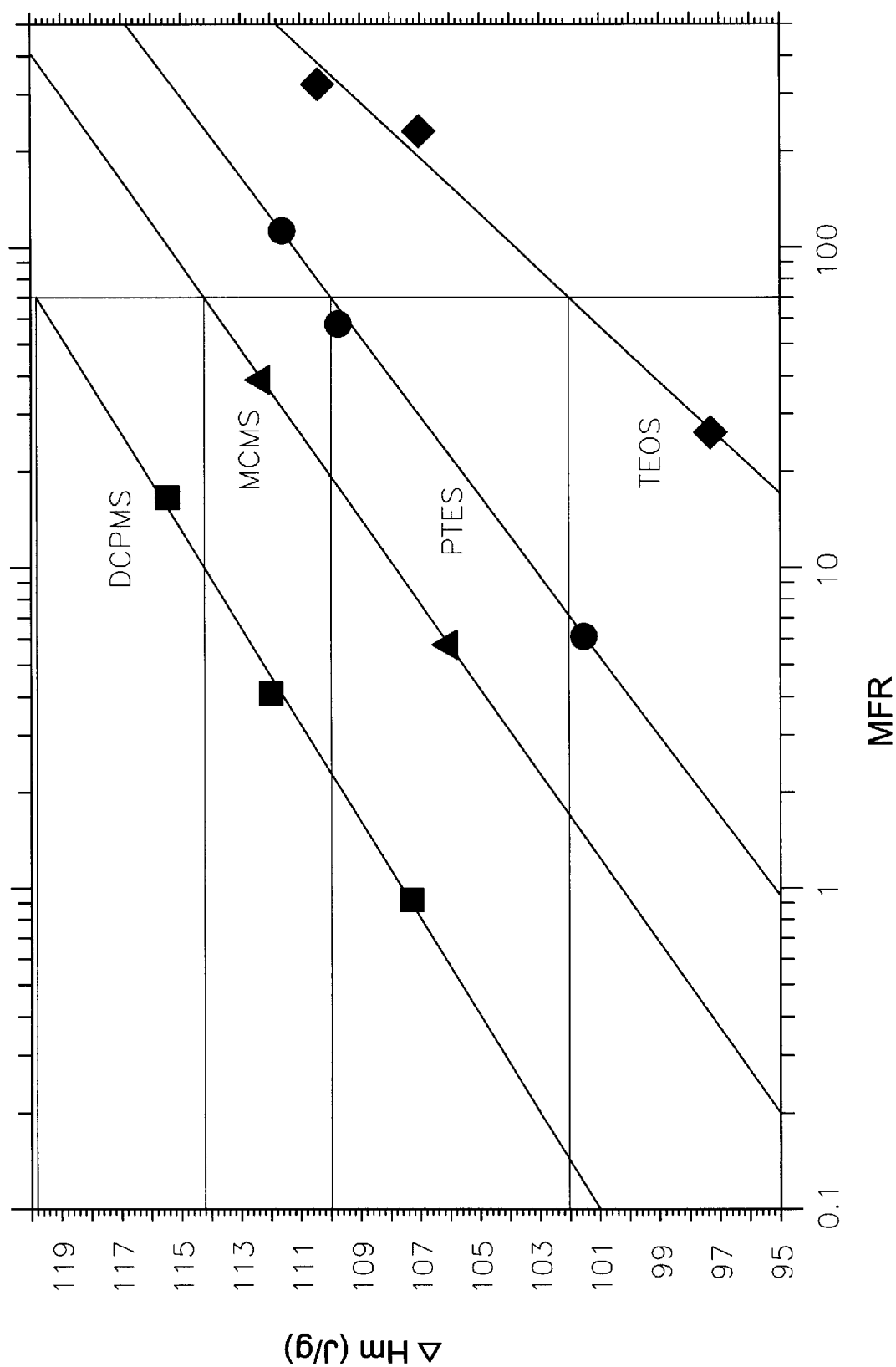

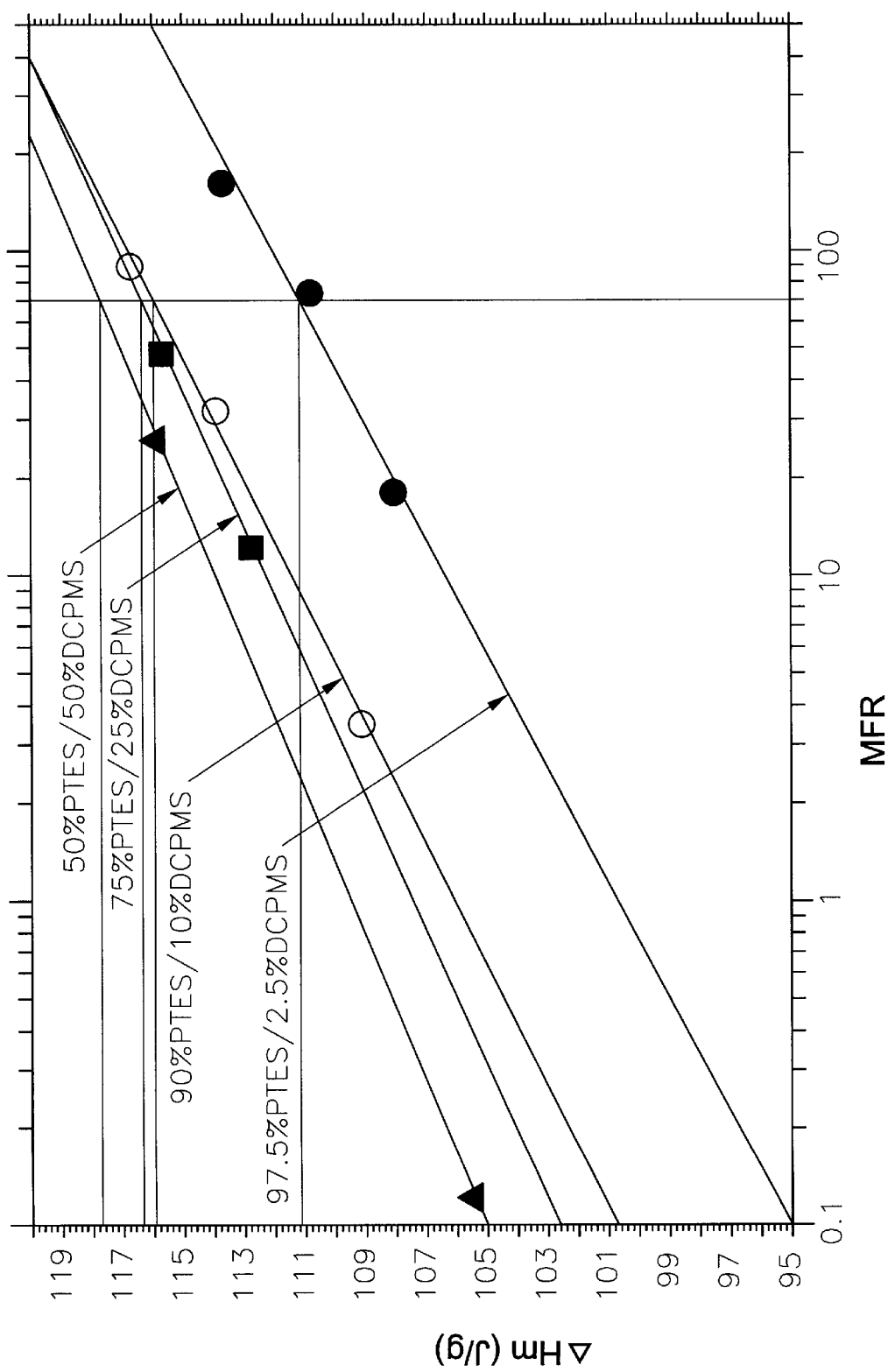

POLYMERIC MATERIALS FORMED USING BLENDS OF ELECTRON DONORS

FIELD OF THE INVENTION

This invention relates to novel, high flexural moduli polymeric materials, i.e., in situ polymerized polypropylene homopolymers, formed by a single stage polymerization process conducted in the presence of a blend of electron donor materials. These novel polypropylene homopolymers can be further used to make high impact polypropylene copolymers. In particular, the present inventors have discovered that by using a blend of a first donor material and a second electron donor material each having different hydrogen responses and stereoregulating properties, an olefin polymer exhibiting an unusually good balances of impact resistance, flexural strength and processability can be provided.

BACKGROUND OF THE INVENTION

The physical properties of homopolymers of propylene formed by typical Ziegler-Natta polymerization are highly dependent on the stereoregularity of the polymer itself. Highly stereoregular polymers are generally crystalline, provide desirable high flexural moduli and are formed with a suitable choice of electron donor. These highly crystalline polymers also display high melting points, but innately exhibit low melt flow rates (R) that render them generally unsuitable for applications that require high processing rates, such as in injection molding, oriented films and thermobond fibers. Further, conventional polypropylene homopolymer and copolymer products formed from highly crystalline polypropylenes lack sufficient impact resistance for many intended uses.

The addition of various electron donor materials to Ziegler-Natta catalysts has been known to influence the degree of stereoregularity in polypropylene homopolymers and copolymers. Generally, a single base catalyst (e.g., a magnesium chloride supported base Ziegler-Natta catalyst) can be used in combination with any number of electron donor materials, each of which, or combinations of which, will lead to a specific level of stereoregularity and MFR. One of the properties of electron donors is that the polypropylene MFR, at the same reactor hydrogen level, decreases with increasing polypropylene stereoregularity caused by the donor. Additional hydrogen is required to reach desirable MFRs when highly stereoregulating donors are employed.

Use of the term copolymer herein, is intended to mean those polymeric materials often known as impact copolymers. Impact copolymers typically include homopolymer polypropylene (homo PP) and an ethylene-propylene copolymer component. All references to the term copolymer are intended to include only impact copolymers (ICP) and not statistical or random copolymers. The production of such ICP's is discussed in Polypropylene Handbook, pg. 92, Hansen Publishers.

This relationship between stereoregularity and MFR poses a problem in processes that have hydrogen pressure limitations. In polypropylene manufacturing plants, hydrogen is used for as a chain transfer agent, which controls the molecular weight of the polypropylene. Molecular weight (MW) of the polypropylene decreases, i.e., the MFR of the polymer increases, with hydrogen concentration in a polymerization reactor. The phrase "MFR/hydrogen response" is typically used to express the efficiency of hydrogen as a chain transfer agent in the polymerization catalyst system process. A catalyst system with higher MFR/hydrogen response will generally produce higher MFR polypropylene at a fixed hydrogen concentration. The maximum MFR in the plant or process is defined by the MFR/hydrogen response of the catalyst system and the maximum $H_2$ levels achievable. Higher MFR polypropylene has been required for larger scale injection molding processes producing items such as automotive or appliance parts. Such MFR's are typically in the range of from 30–100 dg/min. for copolymers, and 75–180 dg/min. for homopolymers, On the other hand, polypropylene with higher crystallinity also has been required to enhance the stiffness and heat distortion temperature of the above discussed products. Crystallinity of polypropylene is defined by the catalyst system. To compare the ability of catalyst systems to produce higher crystallinity polypropylene, crystallinity of the polypropylene at fixed MFR can be used, because crystallinity of polypropylene increases with MFR of the polypropylene. Crystallinity is usually evaluated with heat of fusion (defined herein by ($\Delta H_m$) or alternatively heat of melting) from DSC (Differential Scanning Calorimeter) measurements.

Polypropylene manufacturers have exerted substantial efforts over the past few years to develop a catalyst system which has both higher MFR/hydrogen response and the ability to produce higher crystallinity polypropylene. Higher MFR polypropylene with higher crystallinity is, for example, applied to automotive applications because larger scale injection molded parts with higher stiffness are required.

In processes wherein the desired hydrogen pressure cannot be reached, a more hydrogen responsive donor material must be used. However, the use of such donor materials leads to the formation of less stereoregular polypropylenes with more amorphous polypropylene by-products, producing polypropylenes that lack sufficient flexural moduli for the intended uses of an automotive trim part. Thus, processes that have hydrogen pressure limitations pose a problem because the final achievable MFR will be determined by the choice of electron donor, which in turn determines the level of polypropylene stereoregularity in the final product.

U.S. Pat. No. 5,652,303 ('303) to Ishimaru et al. suggests a method of forming a polypropylene in which propylene monomer is polymerized in the presence of a catalyst system including a solid titanium based Ziegler-Natta catalyst having an internal electron donor component, an organoaluminum compound cocatalyst and a blend of at least two electron donors including an electron donor (A) and an electron donor (B) wherein a relationship between the MFR (a) of homopropylene obtained by using electron donor (A), together with the specified titanium catalyst and organoaluminum co-catalyst; and the MFR (b) of homopropylene obtained by using electron donor (B), together with the same catalyst and co-catalyst is defined by the equation:

$$\log [MFR(b)/MFR(a)] \geq 1.5.$$

The use of a blend of two such electron donors purportedly leads to a broader molecular weight distribution (MWD), exemplified in '303 by MWD's in the range of 6.28 to 8.25, comparative examples ranging from 3.99 to 4.08. The broadening of the MWD allegedly leads to a polymer providing an improved processability.

Therefore, it would be highly desirable to synthesize polypropylene homopolymers in a single stage, in situ polymerization process that forms homopolymers that display both high flexural moduli and high MFRs. The present inventors have discovered that polymerization of an α-olefin in the presence of certain magnesium supported, titanium-base Ziegler-Natta catalyst systems and certain blends of electron donors will result in polymers simultaneously providing higher MFRs and higher levels of crystallinity, leading also to high modulus. It has been further found by the present inventors that the use of such blends of electron donors increases both MFR and crystallinity without substantially increasing MWD. The present invention also provides many additional advantages which shall become apparent as described below.

SUMMARY OF THE INVENTION

Novel in situ polymerized materials (e.g., polypropylene) with substantial degrees of crystallinity and high MFRs can be produced in a single stage polymerization conducted in the presence of certain supported Ziegler-Natta catalysts and a blend of two electron donors including about 2.5 to less than 50 mol.% dicyclopentyldimethoxysilane (DCPMS) and greater than 50 mol.% propyltriethoxysilane (PTES) based on total moles % of electron donor.

A method is presented for forming in situ polymerized homopolymer components that have a relatively narrow molecular weight distribution yet display a high flexural modulus indicative of highly crystalline, isotactic polymer, concurrently with a high MFR. Previously, high MFRs were exhibited only by lesser stereoregular polymers having a higher amorphous content than desireable. The method includes the subjection of an α-olefin (e.g., propylene, 1-butene, 1-pentene, 1-hexene, and the like) to a single stage polymerization in the presence of a supported Ziegler-Natta catalyst and a blend of two electron donors including about 2.5 to less than 50 mol.% dicyclopentyldimethoxysilane (DCPMS) and greater than 50 mol.% propyltriethoxysilane (PTES) based on the total moles of the electron donor.

Other and further objects, advantages and features of the present invention will be understood by reference to claims which follow this specification.

BRIEF DESCRIPTION OF THE DRAWINGS

FIG. 1 is a graph plotting MFR at a constant hydrogen pressure versus $\Delta H_m$ at a fixed rate, 70 MFR for conventional electron donors used individually and blends containing different ratios of propyltriethoxysilane (PTES) and dicyclopentyl dimethoxysilane (DCPMS) electron donors.

FIG. 2 shows the plot of crystallinity ($\Delta H_m$) as a function of the polymer MFR for the individual donors. This was obtained by carrying out polymerizations with each donor at different levels of hydrogen to vary the MFR. The intersection of the crystallinity/MFR line with the vertical line set at 70-MFR represents the crystallinity at 70-MFR, which is the value used in FIG. 1.

FIG. 3 is similar to FIG. 2, but using four different ratios of propyltriethoxysilane (PTES) and dicyclopentyl dimethoxysilane (DCPMS) electron donors. From the figure, the crystallinity at 70-MFR was also obtained and used in FIG. 1.

DETAILED DESCRIPTION OF THE INVENTION

The homopolymer of the single stage, in situ polymerization process of certain embodiments of the present invention simultaneously display high flexural moduli (nucleated homopolymer exhibiting flexural moduli in the range of 220–315 K psi, preferably 280–315 K psi) (with a $\Delta H_m$ in the range of from 95–120 J/g) normally associated with highly crystalline polymers, a high melt flow rates (MFRs) normally associated with less stereoregular polymers and a relatively narrow molecular weight distribution (MWD), generally in the range of from 3–6, preferably 3.5–5.5. These novel homopolymer components are formed in a process where, for example, propylene is subjected to a single stage polymerization in the presence of a Ziegler-Natta catalyst and a blend of two electron donors including about 2.5 to less than 50 mol. % dicyclopentyldimethoxysilane (DCPMS) and greater than about 50 mol.% propyltriethoxysilane (PTES).

Certain Ziegler-Natta catalysts useful in the practice of the present invention are a solid titanium supported catalyst systems described in U.S. Pat. No. 4,990,479 and U.S. Pat. No. 5,159,021. Briefly, the Ziegler-Natta catalyst can be obtained by: (1) suspending a dialkoxy magnesium compound in an aromatic hydrocarbon that is liquid at ambient temperatures; (2) contacting the dialkoxy magnesiumhydrocarbon composition with a titanium halide and with a diester of an aromatic dicarboxylic acid; and (3) contacting the resulting functionalized dialkoxy magnesium-hydrocarbon composition of step (2) with additional titanium halide. A particularly suitable solid catalyst component is a catalyst solid sold by TOHO Titanium Company, Ltd. under the trade name of THC-C-133. Such a catalyst is used to exemplify the invention, other titanium supported catalyst systems are contemplated. Other catalyst use mechanisms are contemplated. Including, but not limited to, batch prepolymerization, in situ prepolymerization and other such mechanisms.

Certain supported Ziegler-Natta catalysts may be used in combination with a co-catalyst. The co-catalyst is preferably an organoaluminum compound that is halogen free. Suitable halogen free organoaluminum compounds are, in particular, branched unsubstituted alkylaluminum compounds of the formula $AlR_3$, where R denotes an alkyl radical having 1 to 10 carbon atoms, such as for example, trimethylaluminum, triethylaluminum, triisobutylaluminum and tridiisobutylaluminum. Additional compounds that are suitable for use as a co-catalyst are readily available and amply disclosed in the prior art including U.S. Pat. No. 4,990,477, which is incorporated herein by reference for purposes of US patent practice. A particularly suitable organoaluminum co-catalyst is triethylaluminum (TEAL).

Electron donors are typically used in two ways in the formation of Ziegler-Natta catalysts and catalyst systems. An internal electron donor may be used in the formation reaction of the catalyst as the transition metal halide is reacted with the metal hydride or metal alkyl. Examples of internal electron donors include amines, amides, ethers, esters, aromatic esters, ketones, nitriles, phosphines, stilbenes, arsines, phosphoramides, thioethers, thioesters, aldehydes, alcoholates, and salts of organic acids. In conjunction with an internal donor, an external electron donor is also used in combination with a catalyst. External electron donors generally affect the level of stereoregularity and MFR in polymerization reactions. External electron donor materials include but are not limited to, organic silicon compounds, e.g. tetraethoxysilane (TEOS), methylcyclohexyldimethoxysilane (MCMS), propyltriethoxysilane (PTES) and dicyclopentydimethoxysilane (DCPMS). Internal and external-type electron donors are described, for example, in U.S. Pat. No. 4,535,068, which is incorporated herein by reference for purposes of U.S. patent practice. The use of organic silicon compounds as external electron donors is described, for example, in U.S. Pat. Nos. 4,218,339, 4,395,360, 4,328,122 and 4,473,660, all of which are incorporated herein by reference for purposes of U.S. patent practice. The blend of electron donors of the present invention is a blend of external electron donors used as stereoregulators, in combination with Ziegler-Natta catalysts. Therefore, except when otherwise indicated, the term "electron donor", as used herein, refers specifically to external electron donor materials.

The external electron donors act to control stereoregularity, which affects the amount of isotactic versus atactic polymers produced in a given system. The more stereoregular isotactic polymer is more crystalline, which leads to a material with a higher flexural modulus. Highly crystalline, isotactic polymers also display lower MFRs, as a consequence of a reduced hydrogen response during polymerization. The stereoregulating capability and hydrogen response of a given electron donor are directly and inversely related. The DCPMS donor has a substantially lower hydrogen response than the PTES donor, but produces a significantly higher level of stereoregularity than PTES.

As shown in FIG. 1, DCPMS is more stereoregulating, and will, at an equal reactor hydrogen pressure, provide a higher level of crystallinity and lower MFR than the lesser stereoregulating PTES donor. The X-axis represents the actual MFR that is obtained when using the specified polymerization donors, with all experiments carried out at 140-mmole of hydrogen, as shown in the experimental section (B). The Y-axis represents the corresponding crystallinity (based on DSC heat-of-melting values, $\Delta H_m$) for a polymer having an MFR of 70 for each specified donor. The Y-values were obtained from a separate set of experiments, where the amount of hydrogen used during the polymerization was varied at different levels, in order to obtain a plot of the MFR versus the crystallinity (FIGS. 2 and 3). It is important to compare the crystallinity at a fixed MFR value because the polypropylene product applications are designed based largely on MFR specifications, because crystallinity of polypropylene increases with MFR of the polypropylene. For the individual donors, an almost linear plot is obtained, which shows a decreasing crystallinity with MFR, when going from DCPMS to MCMS, PTES, and TEOS, respectively. The use of different ratios of propyltriethoxysilane (PTES) and dicyclopentyl dimethoxysilane (DCPMS) electron donors exhibit a different curve which is outside of the line for the individual donors by themselves. The use of the mixed donor system, starting at the 50/50 mole % PTES/DCPMS and up to 97.2%/2.5% PTES/DCPMS, shows higher crystallinity/MFR balance than for the individual donors. The dotted line of FIG. 1 shows the surprising and unexpected result of using the specified blend of PTES and DCPMS. Specifically, the dotted line shows that at a constant hydrogen pressure, for any given MFR, a blend of PTES and DCPMS containing 2.5 mol. % to less than 50 mol. % DCPMS and more than 50 mol. % PTES provides a higher level of crystallinity than would be expected from the average hydrogen response of such a blend, represented by the continuum of the solid line of FIG. 1. This improved degree of crystallinity relative to MFR is not realized when the blend contains less than 2.5 mol. % DCPMS or less than 50 mol. % PTES.

EXPERIMENTAL (A) DSC (Differential Scanning Calorimetry)

A TA-200/DSC-10 instrument purchased from TA Instruments, Inc. was used to measure the thermal properties of the polymers. 8–13 mgs sample of either a polymer granule or a pelletize sample was placed in the cell and the cell purged with nitrogen at room temperature for five minutes. Then the temperature was raised to 230° C. at a heating rate of 50° C. per minute. The temperature was held for ten minutes, followed by cooling to 50° C. at a cooling rate of 10° C. per minute. After reaching 50° C., the sample was again heated to 200° C. at the rate of 10° C. per minute. The heat of melting was measured and the result is designated as $\Delta H_m$.

(B) Polymerization Process in a Batch Reactor

In a 2 liter autoclave polymerization reactor that has been thoroughly cleaned, dried, and purged well with nitrogen was charged, by a syringe an 0.150–0.2 mmole silane donor (from a 0.1M solution in hexane). Then 1.5–2.0 mmole of TEAL (from a 1.0 M solution in hexane) was added, and the reactor was blocked off A specified amount of hydrogen in mmoles was charged from a 300-ml container under high hydrogen pressure. Catalyst in the amount of 8–15 mgs catalyst solid was charged into the reactor by pushing through the catalyst feed tube about 250-cc of liquid propylene. This was followed by introducing 1000-cc of liquid propylene. The reactor temperature was raised from room temperature to 70° C., and the polymerization reaction was allowed to continue for one hour. After the polymerization period, the excess propylene was vented out of the reactor and the remaining polymer was collected and dried under a vacuum oven. The polymer was pelletized with 500 ppm butylated hydroxy toluene (BHT) and samples were taken for MFR, MWD molecular weight distribution, and DSC measurements.

Tables I, II and III show the results the polymerization used to generate FIGS. 1, 2, and 3.

TABLE I

Effects of Donor Type on PP-Crystallinity ($\Delta$Hm) and MFR-Capability

| Sample No. | Donor Type | H2(mmole) | MFR | $\Delta$Hm (J/g) @ 70-MFR* |
|---|---|---|---|---|
| 18270-87 | DCPMS | 140 | 3.43 | 119.8 |
| 19987-125 | MCMS | 140 | 19.5 | 113.8 |
| 18270-37 | PTES | 140 | 59.2 | 110.0 |
| 11373-135-32 | TEOS | 140 | 229.9 | 107.0 |

*Derived from FIG. 2

TABLE II

Effects of Mixed-Donor Type on PP-Crystallinity ($\Delta$Hm) and MFR-Capability

| Sample No. | Donor Type (Mole %) | H2(mmole) | MFR | $\Delta$Hm (J/g) @ 70-MFR* |
|---|---|---|---|---|
| 19987-84 | 97.5% PTES/2.5% DCPMS | 140 | 73.9 | 111.0 |
| 19987-54 | 90% PTES/10% DCPMS | 140 | 31.5 | 116.0 |
| 19987-85 | 75% PTES/25% DCPMS | 140 | 12.8 | 116.4 |
| 1--87-83 | 50% PTES/50% DCPMS | 140 | 8.47 | 117.6 |

*Derived from FIG. 3

TABLE III

Effects of Mixed-Donor Type on PP-Crystallinity ($\Delta$Hm) and MFR-Response

| Sample No. | Donor Type | H2 (mmole) | Actual MFR | $\Delta$Hm (J/g) of Actual MFR |
|---|---|---|---|---|
| 11373-136-03 | 100% DCPMS | 75 | 0.93 | 107.2 |
| 11373-135-27 | 100% DCPMS | 159 | 4.10 | 112.0 |
| 11370-133-30 | 100% DCPMS | 375 | 16.80 | 115.5 |
| 11373-136-11 | 100% MCMS | 75 | 6.00 | 106.1 |
| 17942-005-21 | 100% MCMS | 278 | 39.80 | 112.3 |
| 18270-39 | 100% PTES | 30 | 6.2 | 101.5 |
| 18270-37 | 100% PTES | 140 | 59.2 | 109.8 |
| 18270-51 | 100% PTES | 183 | 112.4 | 111.5 |
| 11373-135-29 | 100% TEOS | 37 | 26.4 | 97.4 |
| 11373-135-32 | 100% TEOS | 140 | 229.9 | 107.0 |
| 17942-05-16 | 100% TEOS | 187 | 321.1 | 110.4 |
| 19562-78 | 97.5% PTES/2.5% DCPMS | 78 | 18.20 | 108.0 |
| 19987-84 | 97.5% PTES/2.5% DCPMS | 140 | 73.90 | 110.7 |
| 19562-80 | 97.5% PTES/2.5% DCPMS | 209 | 162.00 | 113.5 |
| 19562-168 | 90% PTES/10% DCPMS | 47 | 3.59 | 109.1 |
| 19987-54 | 90% PTES/10% DCPMS | 142 | 31.50 | 113.9 |
| 19562-76 | 90% PTES/10% DCPMS | 235 | 87.20 | 116.6 |
| 19987-66 | 75% PTES/25% DCPMS | 147 | 12.00 | 112.6 |
| 19562-140 | 75% PTES/25% DCPMS | 281 | 47.60 | 115.5 |
| PPlant/Condition E | 50% PTES/50% DCPMS | 500 ppm to total Propylene | 0.12 | 105.3 |
| 1965-144 | 50% PTES/50% DCPMS | 243 | 25.90 | 115.7 |

Some polymer MWD results are tabulated in Table IV.

TABLE IV

Polymer MWD By GPC

| Sample No. | Donor Type (Mole %) | H2(mmole) | MFR | MWD |
|---|---|---|---|---|
| 19697-54 | DCPMS | 279 | 2.72 | 3.37 |
| | " | — | 8.8 | 4.44 |
| 19697-29 | PTES | 100 | 42.6 | 3.01 |
| | " | — | 101 | 3.95 |
| | 90% PTES/10% DCPMS | — | 87 | 4.53 |

The relationship of MFR response of the PTES donor with respect to the DCPMS when polymerized under the same hydrogen concentration and using the specified THC-C-133 catalyst is shown the Table V below.

TABLE V

MFR Ratio Relationship Between Using PTES and DCPMS

| Sample No. | Donor Type (Mole %) | MFR at 140-mmole $H_2$ | MFR at 233-mmole $H_2$ | Log (MFRb/MFRa) |
|---|---|---|---|---|
| 18270-87 | DCPMS | 3.43 = a | | 1.24 |
| 18270-37 | PTES | 59.2 = b | | |
| 20565-153 | DCPMS | | 13.3 = a | 1.22 |
| 20864-47 | PTES | | 222 = b | |

The results shown in Table V show that for the two levels of hydrogen concentration used during the polymerization, both values obtained from calculating the Log (MFRb/MFRa) as an MFR-response relationship index from the donors PTES (b-donor) and DCPMS (a-donor) are less than 1.35. And therefore these values are in a region not described by Ishimaru in U.S. Pat. No. 5,652,303.

The following Table VI illustrates the relationship of $\Delta$Hm with other cyrstallinity measurements such as heptane insulubles (%HI) and polymer isotactic sequence sequence length (NRL-meso run length) as measured by NMR.

TABLE VI

Relationship Between $\Delta$Hm with HI and MRL

| Sample No. | DCPMS (mmole) | H2 (mmole) | MFR | $\Delta$Hm (J/g) | HI (%) | MRL NMR |
|---|---|---|---|---|---|---|
| 18270-12-19 | 0 | 75 | 87.3 | 67.44 | 58.5 | 52 |
| 18270-12-26 | 0.006 | 75 | 1.6 | 88.71 | 96.6 | 130 |
| 18270-12-25 | 0.02 | 75 | 1 | 103 | 98.3 | 254 |
| 18270-06-09 | 0.20 | 75 | 1.9 | 104.2 | 98.6 | 366 |
| 18270-12-23 | 1.00 | 75 | 0.8 | 106.4 | 99.0 | 462 |

The results in Table VI show that the heat of melting ($\Delta$Hm) increases with increasing HI and MRL, which are both well known measures of polymer crystallinity.

In general, the catalyst system and donor blend are chosen such that a relationship between a first melt flow rate of a homopolymer formed by polymerizing an alpha-olefin monomer in the presence of a Ziegler-Natta catalyst system and a first electron donor (MFR (a)), and a second melt flow rate of a homopolymer formed by polymerizing an $\alpha$-olefin monomer in the presence of the Ziegler-Natta catalyst system and a second electron donor (MFR (b)), is defined by the equation;

$$1.2 \leq \log [MFR(b)/MFR(a)] \geq 1.4.$$

Preferably the $\alpha$-olefin is chosen from the group consisting of a propylene, 4-methyl-1-pentene, 1-hexene, 1-butene, 1-hexene, 1-decene, 1-dodecene, 1-nonene, and mixtures thereof. Where a copolyice is made, the comonomer may include ethylene.

Propylene is the preferred $\alpha$-olefin.

DCPMS is the preferred electron donor corresponding to a first electron donor, PTES is the preferred second electron donor.

While preferred embodiments in accordance with the invention have been shown and described, it is to be clearly understood that the same are susceptible to numerous changes apparent to one of ordinary skill in the art. Therefore, the invention should not be deemed to be limited to the details shown and described above, but should be considered to include all changes and modifications that come within the scope of the appended claims.

What is claimed is:

1. A method of forming a polymer comprising:
   subjecting propylene monomers to polymerization in the presence of a Ziegler-Natta catalyst and a blend of at least two electron donors, said blend of electron donors comprising about 2.5 mol. % to less than 50 mol. % of a first electron donor based on total mol. % of electron donors wherein the first electron donor consists essentially of dicyclopentyldimethoxysilane (DCPMS) and greater than 50 mol. % of a second electron donor based on total mol. % of electron donors wherein the second electron donor consists essentially of propyltriethoxysilane (PTES) and wherein a relationship between the first electron donor and a second electron donor is defined by an equation;

$1.2 \leq \log[MFR(b)/MFR(a)] \leq 1.4$ wherein MFR(a) is a first melt flow rate of a homopolymer formed by polymerizing propylene monomers in the presence of the Ziegler-Natta catalyst and the first electron donor, and wherein MFR(b) is a second melt flow rate of a homopolymer formed by polymerizing propylene monomers in the presence of the Ziegler-Natta catalyst and the second electron donor, and wherein the MFR(a) is lower than the MFR(b).

2. The method of claim 1, wherein said Ziegler-Natta catalyst system includes a magnesium supported titanium-based solid catalyst.

3. The method of claim 1, wherein said magnesium supported titanium-based solid catalyst is a magnesium chloride supported titanium-based solid catalyst.

4. The method of claim 1, wherein said magnesium supported titanium-based solid catalyst includes an internal electron donor component.

5. The method of claim 1, wherein said Ziegler-Natta catalyst system further comprises an organoaluminum Ziegler-Natta co-catalyst.

6. In the method of claim 1 wherein the polymer has a MWD in the range from 3 to 6.

7. In the method of claim 1 wherein the polymer has a MWD in the range from 3.3 to 5.5.

8. In the method of claim 1 wherein the polymer has a MWD in the range from 3.5 to 4.5.

9. The method of claim 1 comprising from 2.5 to 15 mol. % of the fire electron donor based upon total mol. % of electron donors.

10. The method of claim 1 comprising from 2.5 to 10 mol. % of the first electron donor based upon total mol. % of electron donors.

11. The method of claim 1 comprising from 2.5 to 7 mol. % of the first electron donor based upon total mol. % of electron donors.

12. In the method of claim 1 wherein the polymer comprises a polypropylene homopolymer component.

13. In the method of claim 1 wherein the polymer comprises a copolymer component.

14. In the method of claim 13 wherein the polymer comprising a polypropylene homopolymer component.

15. In the method of claim 13 wherein the copolymer component is further defined as an ethylene-propylene copolymer component.

16. In the method of claim 15 wherein the polymer is further defined as an impact copolymer.

17. In the method of claim 1 wherein a molded article is formed from the polymer.

18. In the method of claim 13 wherein a molded article is formed from the polymer.

19. In the method of claim 15 wherein a molded article is formed from the polymer.

20. A method of forming a polymer having a MWD in the range from 3 to 6 comprising:
subjecting propylene monomers to polymerization in the presence of a ZieglerNatta-catalyst and a blend of at least two electron donors, said blend of electron donors comprising about 2.5 mol. % to 30 mol. % of a first electron donor based on total mol. % of electron donors wherein the first electron donor consists essentially of dicyclopentyldimethoxysilane (DCPMS) and greater than 50 mol. % of a second electron donor based on total mol. % of electron donors wherein the second electron donor consists essentially of propyltriethoxysilane (PTES) and wherein a relationship between the first electron donor and the second electron donor is defined by an equation;

$1.2 \leq \log[MFR(b)/MFR(a)] \leq 1.4$ wherein MFR(a) is a first melt flow rate of a homopolymer formed by polymerizing propylene monomers in the presence of the Ziegler-Natta catalyst and the first electron donor, and wherein MFR(b) is a second melt flow rate of a homopolymer formed by polymerizing propylene monomers in the presence of the Ziegler-Natta catalyst and the second electron donor, and wherein the MFR(a) is lower than the MFR(b).

21. In the method of claim 20 wherein the polymer has a MWD in the range from 3.3 to 5.5.

22. In the method of claim 20 wherein the polymer has a MWD in the range from 3.5 to 4.5.

23. The method of claim 20 comprising from 2.5 to 10 mol. % of the first electron donor based upon total mol. % of electron donors.

24. The method of claim 20 comprising from 2.5 to 7 mol. % of the first electron donor based upon total mol. % of electron donors.

25. In the method of claim 20 wherein the polymer comprises a polypropylene homopolymer component.

26. In the method of claim 20 wherein the polymer comprises a copolymer component.

27. In the method of claim 26 wherein the polymer comprises a polypropylene homopolymer component.

28. In the method of claim 27 wherein the copolymer component is further defined as an ethylene-propylene copolymer component.

29. In the method of claim 28 wherein the polymer is further defined as an impact copolymer.

30. In the method of claim 20 wherein a molded article is formed from the polymer.

31. In the method of claim 26 wherein a molded article is formed from the polymer.

32. In the method of claim 28 wherein a molded article is formed from the polymer.

33. A method of forming a polymer having a polypropylene homopolymer component, an ethylene-propylene copolymer component and a MWD in the range from 3 to 5.5 comprising:
selectively polymerizing propylene and ethylene monomers in the presence of a Ziegler-Natta catalyst and a blend of at least two electron donors, said blend of electron donors comprising about 2.5 mol. % to 10 mol. % of a first electron donor based on total mol. % of electron donors wherein the first electron donor consists essentially of dicyclopentyldimethoxysilane (DCPMS) and greater than 50 mol. % of a second electron donor based on total mol. % of electron donors wherein the second electron donor consists essentially of propyltriethoxysilane (PTES) and wherein a relationship between the first electron donor and the second electron donor is defined by an equation;

$1.2 \leq \log[MFR(b)/MFR(a)] \leq 1.4$ wherein MFR(a) is a first melt flow rate of a homopolymer formed by polymerizing propylene monomers in the presence of the Ziegler-Natta catalyst and the first electron donor, and wherein MFR(b) is a second melt flow rate of a homopolymer formed by polymerizing propylene monomers in the presence of the Ziegler-Natta catalyst and the second electron donor, and wherein the MFR(a) is lower than the MFR(b).

34. The method of claim 33 comprising from 2.5 to 7 mol. % of the first electron donor based upon total mol. % of electron donor.

35. In the method of claim 33 wherein the polymer is further defined as an impact copolymer.

36. In the method of claim 33 wherein a molded article is formed from the polymer.

37. A method of forming a polymer having an MWD in the range from 3 to 6 comprising:

polymerizing propylene monomers in the presence of a Ziegler-Natta catalyst and a blend of at least two electron donors, said blend of electron donors comprising about 2.5 mol. % to less than 50 mol. % of a first electron donor based on total mol. % of electron donors and greater than 50 mol. % of a second electron donor based on total mol. % of electron donors wherein a relationship between the first electron donor and the second electron donor is defined by an equation;

$$1.2 \leq \log [MFR(b)/MFR(a)] \leq 1.4$$

wherein MFR(a) is a first melt flow rate of a homopolymer formed by polymerizing propylene monomers in the presence of the Ziegler-Natta catalyst and the first electron donor, and wherein MFR(b) is a second melt flow rate of a homopolymer formed by polymerizing propylene monomers in the presence of the Ziegler-Natta catalyst and the second electron donor, and wherein the MFR(a) is lower than the MFR(b).

38. The method of claim 37 wherein the first electron donor is dicyclopentyldimethoxysilane.

39. The method of claim 37 wherein the second electron donor is propyltriethoxysilane.

40. The method of claim 37 wherein the first electron donor comprises from 2.5 to 15 mol. % based upon total mol. % of electron donors.

41. The method of claim 37 wherein the first electron donor comprises from 2.5 to 10 mol. % based upon total mol. % of electron donors.

42. The method of claim 37 wherein the first electron donor comprises from 2.5 to 7 mol. % based upon total mol. % of electron donors.

43. The method of claim 37 wherein the polymer comprises a polypropylene homopolymer component.

44. The method of claim 37 wherein the polymer comprises a copolymer component.

45. The method of claim 43 wherein the polymer further comprises an ethylene-propylene copolymer component.

46. A method of forming a polymer comprising:

polymerizing propylene monomers in, the presence of a blend comprising a Ziegler-Natta catalyst, a first electron donor and a second electron donor defined by an equation;

$$1.2 \leq \log [MFR(b)/MFR(a)] \leq 1.4$$

wherein MFR(a) is a first melt flow rate of a homopolymer formed by polymerizing propylene monomers in the presence of the Ziegler-Natta catalyst and the first electron donor, and wherein MFR (b) is a second melt flow rate of a homopolymer formed by polymerizing propylene monomers in the presence of the Ziegler-Natta catalyst and the second electron donor and wherein the MFR(a) is lower than the MFR(b).

47. The method of claim 46 wherein the first electron donor is dicyclopentyldimethoxysilane.

48. The method of claim 46 wherein the second electron donor is propyltriethoxysilane.

49. The method of claim 46 wherein the first electron donor comprises from 2.5 to 30 mol. % based upon total mol. % of electron donors.

50. The method of claim 46 wherein the first electron donor comprises from 2.5 to 15 mol. % based upon total mol. % of electron donors.

51. The method of claim 46 wherein the first electron donor comprises from 2.5 to 7 mol. % based upon total mol. % of electron donors.

52. The method of claim 46 herein the polymer comprises a polypropylene homopolymer component.

53. The method of claim 46 wherein the polymer comprises a copolymer component.

54. The method of claim 52 wherein the polymer further comprises an ethylene-propylene copolymer component.

55. A blend comprising a Ziegler-Natta catalyst and a first electron donor and a second electron donor defined by an equation;

$$1.2 \leq \log [MFR(b)/MFR(a)] \leq 1.4$$

wherein MFR(a) is a first melt flow rate of a homopolymer formed by polymerizing propylene monomers in the presence of the Ziegler-Natta catalyst and the first electron donor, and wherein MFR(b) is a second melt flow rate of a homopolymer formed by polymerizing propylene monomers in the presence of the Ziegler-Natta catalyst and the second electron donor and wherein the MFR(a) is lower than the MFR(b).

56. The blend of claim 55, wherein the first electron donor comprises dicyclopentyldimethoxysilane (DCPMS).

57. The blend of claim 55 wherein the second electron donor comprises propyltriethoxysilane (PTES).

58. The blend of claim 55 wherein the first electron donor comprises from 2.5 to 30 mol. % based upon total mol. % electron donors.

59. The blend of claim 55 wherein the first electron donor comprises from 2.5 to 15 mol. % based upon total mol. % electron donors.

60. The blend of claim 55 wherein the first electron donor comprises from 2.5 to 7 mol. % based upon total mol. % of electron donors.

* * * * *